United States Patent Office 3,020,333
Patented Feb. 6, 1962

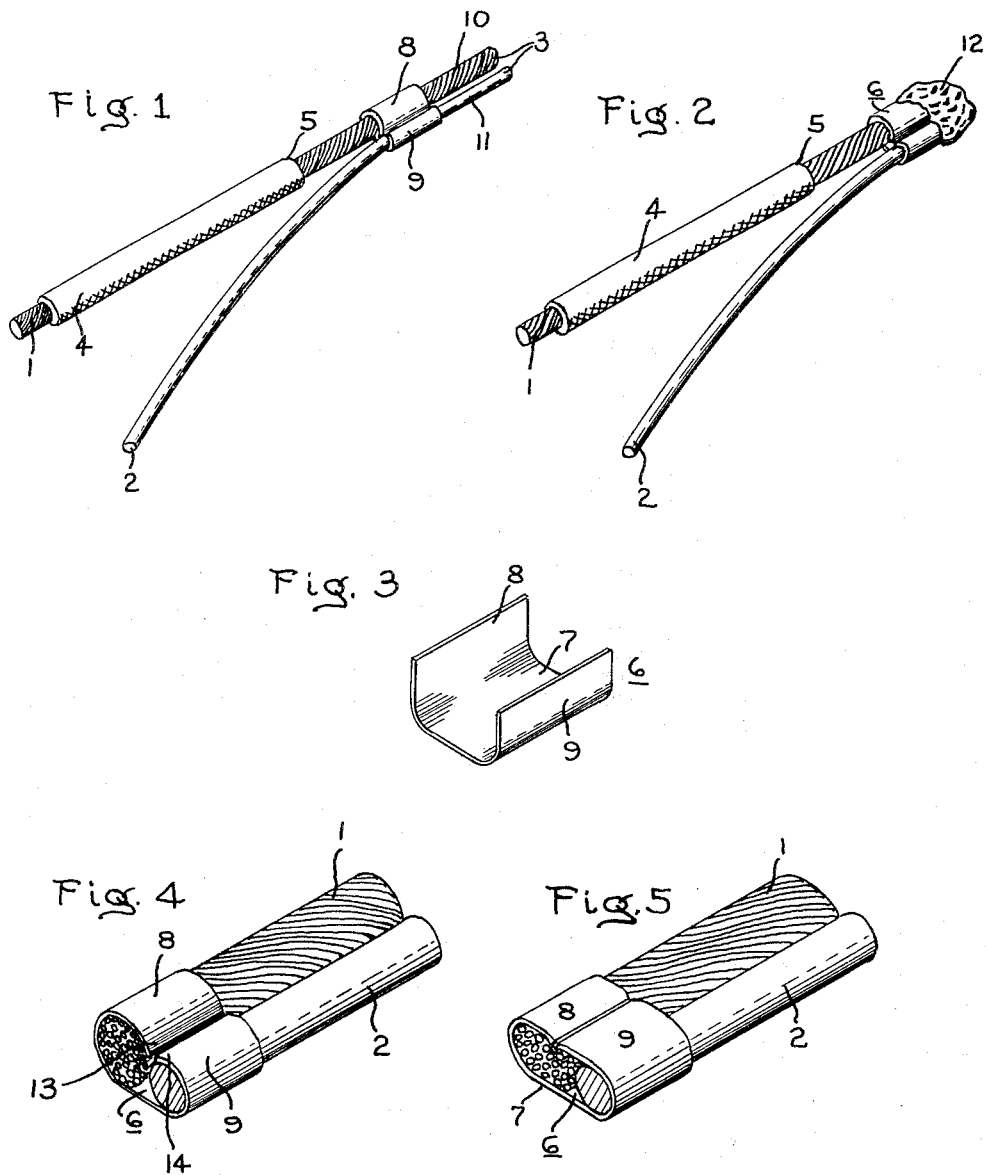

3,020,333
MEANS FOR STRENGTHENING AN INTEGRALLY FORMED JOINT
Robert J. Bangert and Thomas L. Staley, Fort Wayne, Ind., assignors to General Electric Company, a corporation of New York
Filed Sept. 29, 1953, Ser. No. 383,086
1 Claim. (Cl. 174—94)

This invention relates to welding and soldering equipment, and more particularly to an improved means of strengthening joints which have been integrally formed by such equipment.

There are many types of metals, when integrally joined by methods such as the various types of welding and soldering, form a joint which is exceedingly brittle. This is highly undesirable since an electrical connection completed through the integrally formed joints will be broken whenever stress is applied to any wires leading to the joint. The integrally formed joint between a copper wire and an aluminum wire is typical of these electrically desirable but mechanically weak joints. Experimentation has shown that the integral joint itself in such a case shows little susceptibility to toughening whatever the welding or soldering process that is used. It is, therefore, desirable in integrally formed joints between metals whose nature, or natures, causes a brittle joint to provide strengthening means so that an electrical connection will be insured despite stresses exerted on the wires leading into the joint.

An object of this invention is, therefore, to provide a ferrule in conjunction with an integrally formed joint which will incorporate the desirable features set forth above.

Further objects and advantages of this invention will become apparent and the invention will be better understood by reference to the following description and the accompanying drawing; the features of novelty which characterize this invention will be pointed out with particularity in the claim annexed to and forming a part of this specification.

This invention, in one embodiment thereof, provides a ferrule which is secured about the wires to be joined at a point which is in contact with the integrally formed joint of the wires. This ferrule will provide mechanical strength to absorb any stress on any of the wires and prevent it from reaching the brittle integral joint. If the ferrule is placed so close to the joint that one end of the ferrule becomes molten and a part of the joint, the addition of the material of which the ferrule is composed will, in many combinations of metals, help toughen the joint. This is particularly true where aluminum is one of the metals to be joined and an aluminum ferrule is added thereto. The increase in the proportion of aluminum forming the joints may be counted on to decrease the brittleness of the joint itself, particularly where the other material in the joint is copper.

In the drawing,

FIGURE 1 is a view in perspective of a pair of wires mechanically joined by the ferrule of this invention before an integral joint is formed;

FIGURE 2 is a view in perspective of the wires of FIGURE 1 after the forming of the integral joint at the ends of the wires;

FIGURE 3 is a view in perspective of the improved strengthening means of this invention before being formed around the wires;

FIGURE 4 is a view in perspective of the improved strengthening means of this invention after it has been clamped around a pair of wires; and FIGURE 5 is a view in perspective of a modified means of clamping the wires together with the improved strengthening means.

Referring now to FIGURE 1 of the drawing, there are shown a stranded copper wire 1 and an aluminum wire 2 which are to be integrally joined at one end 3, generally for the purpose of forming an electrical connection. Copper wire 1 is shown as having an insulating cover 4 which is cut away at 5 to permit the bare end of wire 1 to protrude therefrom. A small rectangular piece of metal 6, preferably aluminum in this case, is shaped as shown in FIGURE 3. Ferrule 6 has a flat section 7 and a pair of upwardly extending walls 8 and 9. Referring again to FIGURE 1, it will be seen that ferrule 6 has been placed around wires 1 and 2, wall 8 has been bent down around copper wire 1, and wall 9 has been bent in the same fashion around aluminum wire 2. Part 10 of wire 1 extends beyond the ferrule as does part 11 of wire 2.

Referring now to FIGURE 2, it will be seen that parts 10 and 11 have been heated to a point where they have become an integral mass 12 which is partly composed of the material of wire 1 and partly of the material of wire 2. It will be seen in addition that mass 12 has been caused to extend back to overlap ferrule 6; thus, part of the ferrule has been put in a molten state and made to combine into mass 12. Since, as here, the two wires 1 and 2 are of copper and aluminum respectively, and ferrule 6 is also of aluminum, mass 12 will be formed of these two metals. It is well known that the smaller the percentage of copper in mass 12 the less brittle it will be; therefore, the aluminum taken from ferrule 6 by mass 12 will increase the percentage of aluminum in mass 12 and thereby decrease the brittleness. It will clearly be seen that, by causing part of ferrule 6 to be used in mass 12, ferrule 6 strengthens the integral joint in two ways: by the addition of aluminum in mass 12; and by the fact of absorbing stresses in the wires before they are able to reach mass 12.

Referring now to FIGURE 4, the preferred manner of forming ferrule 6 about wires 1 and 2 will be described. According to this preferred method, wall 8 of ferrule 6 is bent down around wire 1 as at 13, and wall 9 is bent down around wire 2 as at 14 in the same manner. It will be seen that, by bending ferrule 6 around wires 1 and 2 as at 13 and 14, it is possible to completely separate these wires from each other. This is a highly desirable feature where one of the wires is formed of an anodic material and the other is composed of a cathodic material. In such a case the presence of excessive moisture will, as is well known, cause the two wires to act as an electrolytic cell if they are permitted to touch each other. This effect has the results of eating away the material forming the anode. Where copper and aluminum are used together, as in the embodiment described herein, the aluminum wire 2 would act as the anode (aluminum being an anodic material) and the copper wire 1 would act as the cathode (copper being a highly cathodic material). By separating the two wires, as in FIGURE 4, the only anodic material in contact with copper wire 1 becomes ferrule 6; thus, the presence of moisture would cause only wall 8 of ferrule 6 to be attacked since that would be the only aluminum close enough to become a part of the electrolytic process. By this means aluminum wire 2 would be protected against deterioration and the danger of a break in an electric circuit, which might be caused by the slow disappearance of aluminum wire 2, is avoided.

The embodiment of FIGURE 5 show a ferrule 6 which may be used where the danger of an electrolytic process between the two wires 1 and 2 is not present. In this case walls 8 and 9 are merely wrapped around wires 1 and 2 respectively without any effort to force them down between the wires. This embodiment has an economical advantage since the forming of ferrule 6 around wires 1 and 2 is easily performed and is not critical.

It is clear from the above description that this invention provides a means for providing mechanical strength to any integral joint between two wires. In addition, further advantages may be secured by the positioning of the ferrule in cases where the method used, and the different materials forming the integral joint, make it desirable. Still another feature that has been brought out is the ability to prevent any electrolytic process between two wires of different materials, one having cathodic characteristics and the other anodic characteristics.

It will also be understood that a countless variety of different shapes and positions are available for the ferrule. For instance, the ferrule may be merely shaped as a flat piece to start with, or it may be given tabs at each end for additional strength. It may be formed around the wires either in order to clamp and separate them, or else merely to press them together. In the latter event the ferrule may be caused to be flattened, round, or any intermediate or other shape.

While this invention has been explained by describing a particular embodiment thereof it will be apparent that improvements and modifications may be made without departing from the scope of the invention as defined in the appended claim.

What we claim as new and desire to secure by Letters Patent of the United States is:

A pair of wires adapted to be integrally joined, one of said wires being composed of aluminum, the other of said wires being disposed of copper, said wires being composed in side-by-side closely spaced apart parallel relationship, and a ferrule member formed of aluminum sheet material and adapted to clamp said wires together, a portion of said ferrule positioned around said wires and having its ends extending inwardly between said wires thereby maintaining said wires out of contact with each other and preventing an electrolytic process therebetween, and an integral alloy joint formed solely of the ends of said wires and a portion of said ferrule electrically uniting said wires, said joint being strengthened both by the addition of aluminum in said joint from said ferrule and by the clamping portion of the ferrule which absorbs stresses in said wires before such stresses can be transmitted to said joint.

References Cited in the file of this patent

UNITED STATES PATENTS

| | | |
|---|---|---|
| 1,171,591 | Chubb | Feb. 15, 1916 |
| 1,707,317 | Pipes | Apr. 2, 1929 |
| 1,745,180 | Mischler | Jan. 28, 1930 |
| 2,296,443 | Kleinfelder | Sept. 22, 1942 |

FOREIGN PATENTS

| | | |
|---|---|---|
| 870,308 | France | Dec. 5, 1941 |
| 418,823 | Italy | Mar. 5, 1947 |